(12) United States Patent
Peck et al.

(10) Patent No.: US 10,090,673 B1
(45) Date of Patent: Oct. 2, 2018

(54) DIRECT CURRENT POWER SYSTEM WITH AC GRID, PHOTO VOLTAIC, AND BATTERY INPUTS

(71) Applicant: Enlighten Luminaires LLC, Paramus, NJ (US)

(72) Inventors: Andrew Peck, Paramus, NJ (US); Yang Ye, Scarborough (CA)

(73) Assignee: ENLIGHTEN LUMINAIRES, Paramus, NJ (US)

( * ) Notice: Subject to any disclaimer, the term of this patent is extended or adjusted under 35 U.S.C. 154(b) by 0 days.

(21) Appl. No.: 15/594,718

(22) Filed: May 15, 2017

(51) Int. Cl.
*H02J 1/00* (2006.01)
*H02J 7/00* (2006.01)

(52) U.S. Cl.
CPC ........... *H02J 1/00* (2013.01); *H02J 7/007* (2013.01); *H02J 2001/002* (2013.01); *Y02E 10/563* (2013.01)

(58) Field of Classification Search
CPC ............... H02J 2001/002; Y02E 10/563
See application file for complete search history.

(56) References Cited

U.S. PATENT DOCUMENTS

| | | | |
|---|---|---|---|
| 5,268,832 A | 12/1993 | Kandatsu | |
| 7,009,859 B2 | 3/2006 | Chen et al. | |
| 8,174,856 B2 | 5/2012 | Chapman | |
| 8,378,656 B2 | 2/2013 | de Rooij et al. | |
| 8,842,451 B2 | 9/2014 | Phadke et al. | |
| 8,884,463 B2 | 11/2014 | Dibachi et al. | |
| 8,921,685 B2 | 12/2014 | Razin et al. | |
| 9,118,213 B2 | 8/2015 | Koehl | |
| 9,263,183 B2 | 2/2016 | Chapman et al. | |
| 9,350,257 B2 | 5/2016 | Koo et al. | |
| 9,391,537 B2 | 7/2016 | Kimura et al. | |
| 9,397,611 B2 | 7/2016 | Judkins et al. | |
| 9,444,327 B2 | 9/2016 | Lin | |
| 9,477,247 B2 | 10/2016 | Ehlmann et al. | |
| 2011/0273022 A1* | 11/2011 | Dennis | H02J 1/10 307/72 |
| 2012/0104863 A1 | 5/2012 | Yuan | |
| 2013/0076135 A1 | 3/2013 | Zhu et al. | |
| 2014/0084687 A1 | 3/2014 | Dent | |
| 2014/0333141 A1 | 11/2014 | Hu et al. | |
| 2015/0045979 A1 | 2/2015 | Chen et al. | |
| 2016/0181944 A1 | 7/2016 | James et al. | |

* cited by examiner

*Primary Examiner* — Daniel Cavallari
(74) *Attorney, Agent, or Firm* — Michael J. Feigin, Esq.; Feigin and Fridman LLC

(57) ABSTRACT

A direct current electrical power system having AC grid power attached to the bus through AC/DC converter, PV panel attached to the bus through DC/DC pre-conditioner, a first direct current load attached directly to the bus, and a second direct current load attached to the bus through a DC/DC converter. The function of the AC grid and AC/DC converter is to create and regulate the DC bus voltage. The function of the PV power is to provide as much power as required to the DC loads. Since the conversion efficiency of the DC/DC pre-conditioner is much higher than that of the AC/DC converter, the conversion loss is greatly reduced if the load is mainly powered from PV instead of AC grid. In addition, a battery can be attached to the bus through a battery charger/controller, which is a bi-directional DC/DC converter.

4 Claims, 3 Drawing Sheets

DIRECT CURRENT POWER SYSTEM WITH AC GRID, PHOTO VOLTAIC, AND BATTERY INPUTS

FIELD OF THE DISCLOSED TECHNOLOGY

This invention is related to the field of electrical power systems, and more specifically, to a system of powering a direct current power sink with photo-voltaic cells in order to direct a current bus with a plurality of power sources and power sinks.

BACKGROUND OF THE DISCLOSURE

Direct Current (herein "DC") is required for a wide variety of electronics and equipment. Typically, one uses a transformer to convert alternating current (herein "AC") power to DC which is inefficient. Or, even if using a DC power source, such as a solar panel/photo-voltaic input (herein, "PV"), one converts this power to AC and then back to DC. In still other versions of prior art systems, there is DC input and DC output with a battery there-between and/or voltage conversion.

Each of these involves inefficiencies, but is typically required because the power source at one's disposal is either AC or unstable. That is, when using a PV panel for power, the output is usually unstable because of the reliance on energy from the sun, the amount which reaches the panel changing throughout the day and being all but practically non-existent at night.

FIG. 1 shows a prior art power conversion device with a photovoltaic inverter. Within the inverter is a DC/DC pre-conditioner and a DC/AC inverter. In this case, the load interfaces with an AC power grid (source of power provided as AC current from outside a physical location or address where the power is being used). The power sink (the device that utilizes the current to perform an action) receives only AC power with no detectable PV or DC input at the point on a circuit or bus where the power sink is located. The conversion loss of PV power includes DC/DC loss and DC/AC inversion loss. About 40% of power loss is due to the DC/DC loss and 60% due to the DC/AC inversion.

FIG. 2 shows a prior art photovoltaic charging system. The charger has a DC/DC pre-conditioner and a DC/DC charger. The interface between the battery and load might have a battery controller as well. For simple applications, the load can connect to the battery directly. For more complex systems, a battery controller (a device which controls when current is drawn from the battery and placed into the bus, alone or in addition to existing current) is needed. In this case, the load interfaces with the battery, and the PV power source is undetectable within the circuit at the point of the load. ("Load", "power load", "sink", and "power sink" are used interchangeably in this disclosure, the definition being provided above with respect to FIG. 1.) The conversion loss of PV power in this case includes both DC/DC loss and DC/DC charger loss. Each contributes to about 50% of the power loss.

While these prior art systems overcome the problem of incorporating and being able to use a PV power output to power a device, they are inefficient. What is needed is a way to more efficiently use an unstable power source.

SUMMARY OF EMBODIMENTS OF THE DISCLOSED TECHNOLOGY

An embodiment of the disclosed technology is a direct current (DC) electrical system having multiply inputs and outputs. The bus voltage of the system is provided by either the AC grid through AC/DC converter whenever AC grid voltage is available, or the battery through DC/DC converter when AC grid voltage is unavailable. A photo-voltaic power source outputs (DC) is connected to the bus through a DC/DC pre-conditioner. A DC/DC pre-conditioner is defined as a device which provides current to a stable output voltage from an unstable input voltage. As the bus voltage is provided by either the AC grid or the battery, the photo-voltaic power source provides current to the bus at the maximum power point of the photo-voltaic panels. The maximum power point is the combination of the output voltage and output current of the photo-voltaic panel, at which the output power reaches its maximum value.

In the above embodiments, a photo-voltaic power source outputs (DC) power into the bus through the DC/DC pre-conditioner. The output power is always at the maximum power point of the photo-voltaic panel. The first direct current load is connected to the bus. The power rating of the photo-voltaic panel is selected such that the output power can meet the majority of the power demand by the load. As such, the system is designed such that minimum power conversion, storage of power, or the like is needed between the PV power source and the DC power sink during, at least, peak operating hours of the PV power source. AC grid is only providing the amount power that is not sufficient from photo valtaic power. In this manner, the power is used most efficiently while still, other devices such as AC power sources, batteries, and other DC loads with other power requirements, can be connected to the DC power bus. A "bus" is defined as a plurality of conductors over which electrical current is propagated between devices, the bus having a consistent voltage (within an acceptable tolerance level chosen by the operator or manufacturer of the bus) throughout.

Connected to the bus can be an alternating current (AC) power source, connected by way of an AC/DC converter. A battery can also be connected to the bus by way of a bidirectional DC/DC converter. If the output power from the photo-voltaic power source exceeds the demand by the first direct current load, in embodiments of the disclosed technology, the surplus power from the photo-voltaic power source can be stored into the battery through the bidirectional DC/DC converter. In this case, the bidirectional DC/DC converter operates as a battery charger. If the output power from the photo-voltaic power source is not enough to fulfill the demand of the load, the balance will be provided from AC grid through AC/DC converter. In this case, the battery is not charged, as long as the battery capacity is higher than the minimum level. In case the battery capacity falls belows the minimum level, AC grid power will be provided to charge the battery back to the minimum level only.

Over a 24-hour period (or one day) a majority of power to the first direct current load is provided directly by way of output from the photo-voltaic power source in some embodiments. This is due to the calibration between the DC power sink's energy requirements and the expected output from the PV power source.

A method of directly powering a DC bus system and DC load using a photo-voltaic power source works similarly to the device described above. One directly connects a first direct current load to a DC bus, a photo-voltaic power source to the DC bus such that the photo-voltaic power source has a maximum output into the DC bus greater than that of the first direct current load, and an AC power source to an AC/DC converter which is connected to the DC bus. The AC power source provides power to the DC bus only when the photo-voltaic power source provides less power than the demand of the first direct current load.

A second load having a voltage substantially different than the voltage of the bus can be utilized. A battery can also be connected to the bus. The battery can use (be charged with) excess current from the direct current electrical bus system when input from the photo-voltaic power source exceeds usage by the first direct current load. Electrical current from the AC power source powers, at least in part, the first direct current load when output from the photo-voltaic power source is less than the demand from the first direct current load, in some embodiments.

Any device or step to a method described in this disclosure can comprise or consist of that which it is a part of, or the parts which make up the device or step. The term "and/or" is inclusive of the items which it joins linguistically and each item by itself. Any device, method, or term can be as described "substantially" as described, the term "substantially" being defined as "within a tolerance level acceptable in the art," or, if this definition is found to be imprecise, "within 5%" of the term being modified by 'substantially'."

DETAILED DESCRIPTION OF EMBODIMENTS OF THE DISCLOSED TECHNOLOGY

A direct current electrical system is configured such that different power sources and loads are connected to a direct current bus. The bus voltage is created and regulated by AC grid through an AC/DC converter. A first direct current load is connected to the bus. The photo-voltaic power source provides power to the bus at its maximum power point tracked by the DC/DC preconditioner. Since the converter efficiency of the DC/DC preconditioner is much higher than the AC/DC converter, it is preferred to have as much power as possible to be covered by the photo-voltaic panel. So the power rating of the photo-voltaic panel is designed such that it covers the majority of the load demanded by the load. Only a small amount of load demand is to be covered by AC grid. The main function of the AC grid is to regulated the direct current bus voltage.

If the available power from the photo-voltaic panel is more than the load demand, the surplus power from the photo-voltaic panel can be used to charge a battery, which is connected to the bus through a bi-directional DC/DC converter. The bi-directional DC/DC converter can either charge or discharge the battery, depending on the operating conditions.

If for some reason, AC grid power is unavailable, the direct current bus voltage will be regulated by the battery through the bi-directional DC/DC converter. In this case, still the majority of the load demand is to be covered by the photo-voltaic panel. The battery only covers a small amount of load. The main function of the battery is to regulate the direct current bus voltage.

If both AC grid and photo-voltaic power are unavailable, for example, the AC grid power fails at night, then the battery becomes the only source of power. The battery will regulate the direct current bus voltage, and also provide power to the load. In this case, the load will be commanded to operate at the minimum power rating, to ensure the battery power can last long enough.

There is a second direct current load, with a voltage substantially different from the first direct current load. The second direct current load is attached to the direct current bus through a DC/DC converter, which coverts the direct current bus voltage to the voltage required by the second direct current load.

Embodiments of the disclosed technology will become more clear in view of the following description of the figures.

Figure 2:
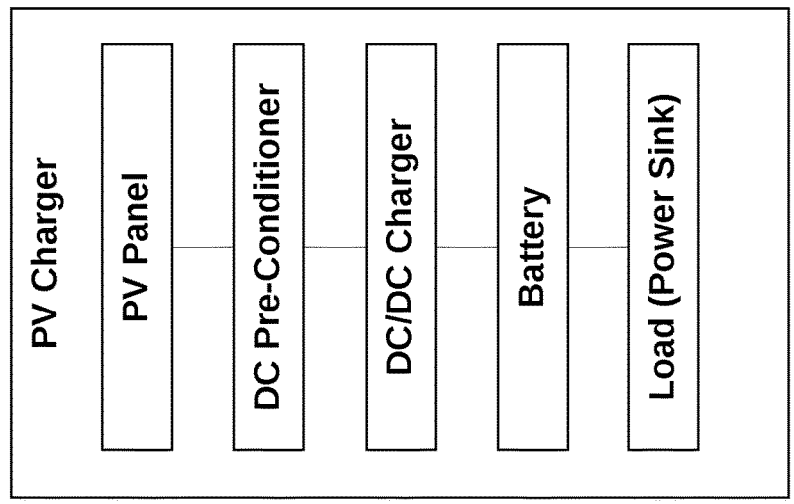
FIG. 2 shows a prior art photovoltaic powered system with a battery to store energy.
Figure 1:
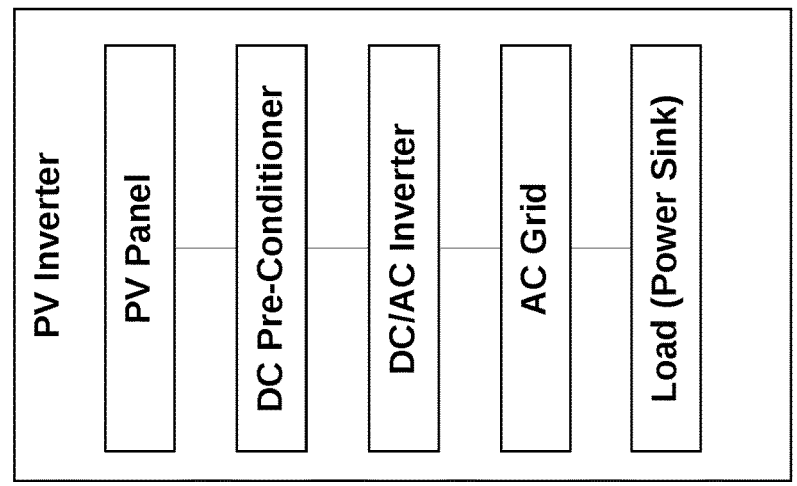
FIG. 1 shows a prior art photovoltaic powered alternating current bus system.
Figure 3:
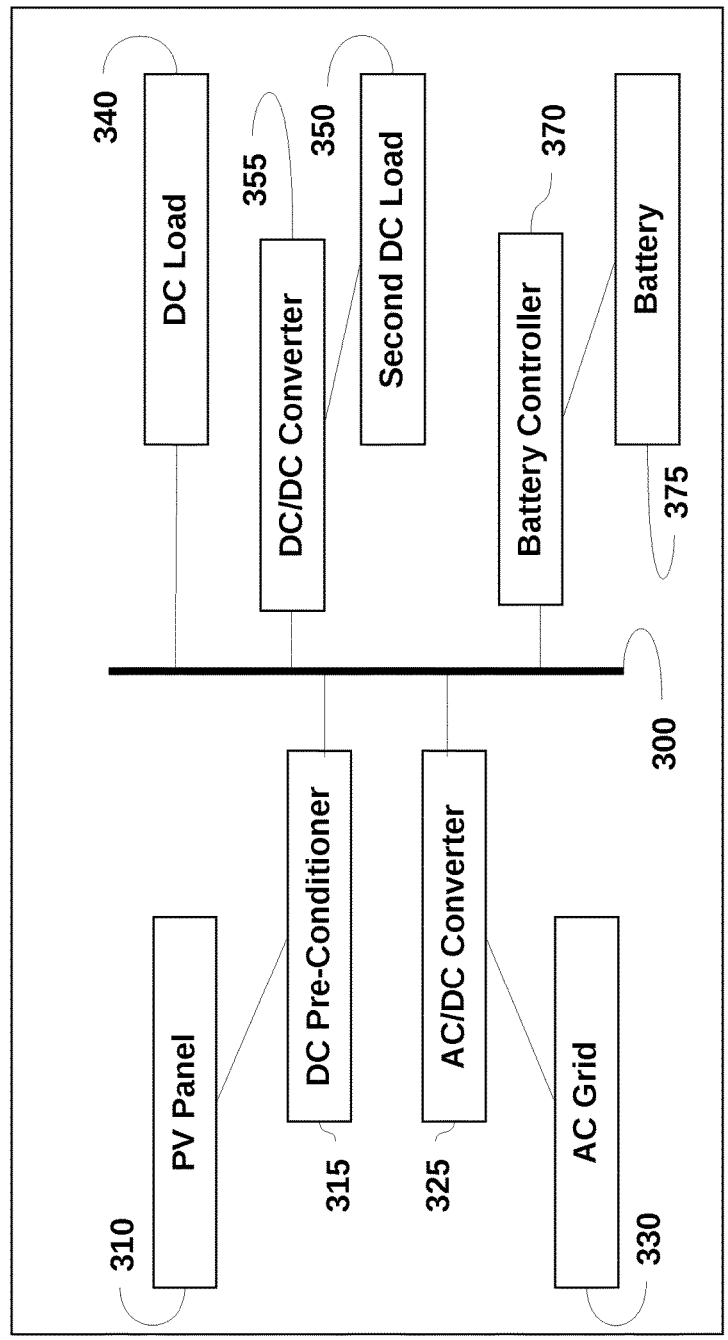
FIG. 3 shows a DC current bus system of embodiments of the disclosed technology.

FIG. 3 shows a DC power system of embodiments of the disclosed technology. A PV system is shown with a DC bus 300 at a backbone. The other devices each connect into the DC power system, as shown.

An input into the DC bus 300 is an AC power source 330, such as supplied by a utility company off-site from the bus system 300. This power is converted to DC by the AC/DC converter 325. The DC voltage after the conversion becomes the DC bus voltage. The main function of the AC/DC converter 325 is to regulate the DC bus voltage.

A further input into the DC bus 300 is a PV panel 310, a photo-voltaic power source, is connected into the bus through a DC pre-conditioner 315. The pre-conditioner 315 ensures that the PV panel is operating at its maximum power point, and that the output of the pre-conditioner is a DC current to a stable output voltage which is regulated by AC grid through AC/DC converter. The output current or voltage from the PV panel may change during the course of usage, and is an "unstable" power source because constant output of current is not guaranteed. In embodiments, however, the voltage of the output of the pre-conditioner 315 of PV panel or PV panel system (a combination of PV panels) is the same as the voltage of DC bus 300, which is regulated by AC grid 330 through AC/DC converter 325.

On the other side of the figure, also connected to the DC bus 300 are various power sinks or loads including a first DC load 340, and a second DC load 350. In embodiments, at least the first DC load 340 is calibrated with respect to the PV panel 310 such that the DC load 340 can be powered directly by the PV panel without need for the AC grid power or battery 375. This is done by determining either the PV panel (a term which, again, includes an individual panel or a plurality of panels in a system which output DC current) maximum and/or typical output, or the current requirements/average/typical load from the DC load 340. In embodiments, the output of the PV panel (maximum or typical) or power requirements of the DC load 340 (maximum or typical) are set close to each other, with the DC load power demand being a littler higher than the PV panel power rating. In this way, the DC load 340 is powered most efficiently, because other than the DC pre-conditioner 315, no energy is lost to power conversation (AC to DC or DC to DC). In fact, the conversion loss in the preconditioner 315 is only about 2% of total energy outputted from the PV panel.

A second DC load 350 may be used. DC load 350 has a voltage rating substantially different from the DC bus load. Therefore DC load 350 cannot be attached to the bus directly. A DC/DC converter 355 has to be connected between DC bus 300 and DC load 350.

Further, excess energy outputted by the PV panel can be stored into a battery 375. This occurs when the PV panel has a power output greater than that which is drawn by the DC load 340 and/or DC load 350. A battery charger/controller 370, which is a bidirectional DC/DC converter, determines when to draw energy from the bus 300 and store energy in the battery 375, and when to retrieve stored energy from the battery 375 and return the energy to the bus. The latter happens when, in embodiments of the disclosed technology, the AC grid 330 is unavailable, and the power drawn by the DC load 340 and/or DC load 350 is greater than that which is provided by the PV panel 310. If and only if the AC grid 330 is lost, and the loads 340 and 350 are drawing more energy than the PV panel is outputting, then power is drawn from the Battery 375.

Figure 4:
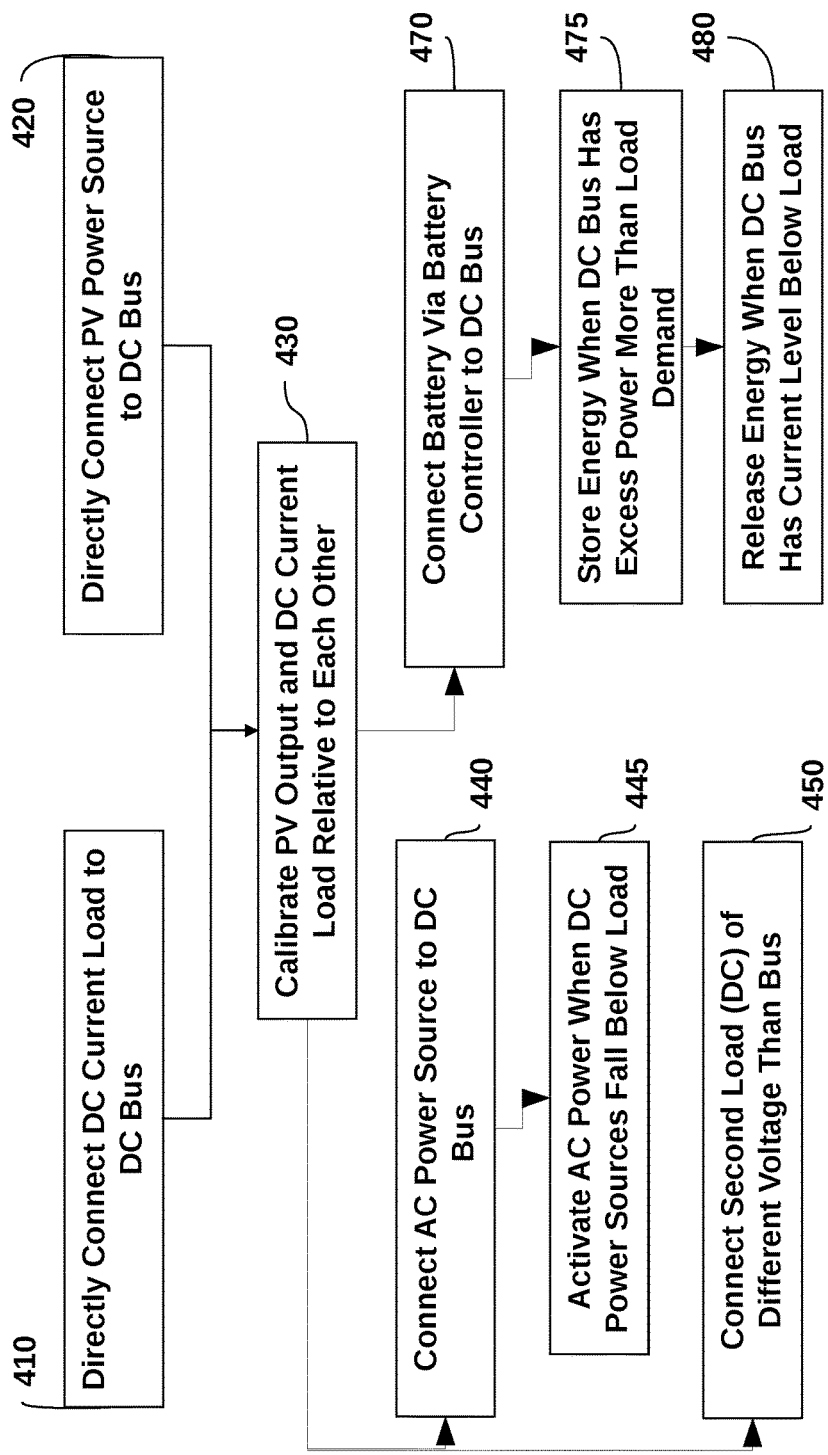
FIG. 4 shows steps taken in a method of arranging a DC current bus in embodiments of the disclosed technology.

FIG. 4 shows steps taken in a method of arranging a DC current bus in embodiments of the disclosed technology.

In step 405, the AC power availability is checked within AC/DC converter. Once AC power is available, AC/DC converter will start to create and regulate the DC bus voltage in step 410. Then in step 420, DC load is connected to the bus, and DC/DC pre-conditioner starts working. In step 423, whether the PV power is more than the load demand is checked from the DC bus voltage. If the DC bus voltage becomes higher than the regulated value of AC/DC converter, it means PV power is more than load demand. In this case, in step 426, the battery capacity is to be checked from the battery voltage. If the battery voltage is lower than the upper limit, it means the battery is not full. Then in step 430, the battery is to be charged to absorb the surplus power from the PV panel. If after step 426, the battery is equal or higher than the upper limit, it means the battery is full. Then in step 460, the DC/DC pre-conditioner has to reduce the output power from the PV panel, so that the DC bus voltage is reduced to the regulated value. If after step 423, the DC bus voltage is remain regulated, it means the PV power is not enough to cover the total load demand, then step 405 will start over again.

If after step 405, it is found that AC power is not available, then in step 435, the battery voltage is to be checked. If the battery voltage is higher than the lower limit, then in step 440, the battery charger/controller will regulate the DC bus voltage. Then in step 450, DC load is connected to the bus, and DC/DC pre-conditioner starts working. In step 455, whether the PV power is more than the load demand is checked from the DC bus voltage. If the DC bus voltage becomes higher than the regulated value of AC/DC converter, it means PV power is more than load demand. In this case, since the battery is regulating the DC bus voltage, it cannot be charged. So in step 460, the DC/DC pre-conditioner has to reduce the output power from the PV panel, so that the DC bus voltage is reduced to the regulated value. If after step 455, the DC bus voltage is remain regulated, it means the PV power is not enough to cover the total load demand, then step 405 will start over again.

If after step 435, the battery voltage is found to be lower than the lower limit, it means the battery is empty. In this case, both AC grid and battery are unavailable. Then in step 465, the availability of the PV power is to be checked. If PV power is available, then in step 470, DC/DC pre-conditioner will start, and battery charger/controller will be operating at charger mode, to charge the battery. In step 475, the battery voltage is to be checked. If the battery voltage is still lower than the lower limit, then keep charging by going back to step 470. If the battery voltage is higher than the lower limit, then go to step 455 to regulate the DC bus voltage by operating the battery charger/controller in controller mode.

In step 470, a battery is connected via a battery connector to the DC bus. This battery stores energy from the PV input which is received in excess of the load in step 475. The battery releases the stored energy in step 480, when the DC bus has a current level which is below the requirements of the load. A battery is defined as a device which stores electrical energy in a manner in which it may be retrieved later, at least in part, as electrical energy such as by carrying out a reversible chemical reaction. The release of energy from the battery in step 480 precludes obtaining energy from the AC power source in step 445, in embodiments of the disclosed technology.

Further, it should be understood that all subject matter disclosed herein is directed and should be read only on statutory, non-abstract subject matter. All terminology should be read to include only the portions of the definitions which may be claimed. By way of example, "computer readable storage medium" is understood to be defined as only non-transitory storage media.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

The invention claimed is:

1. A method of powering a DC bus system and DC load using a photo-voltaic power source, comprising the steps, in any order, of:
   connecting a first direct current load to a DC bus;
   connecting a photo-voltaic power source to said DC bus such that said photo-voltaic power source has a maximum output into said DC bus greater than that of said first direct current load;
   connecting an AC power source to an AC/DC converter which is connected to said DC bus, wherein said AC power source provides power to said DC bus only when said photo-voltaic power source provides output below said first direct current load;
   connecting a second direct current load having a voltage substantially different than said voltage of said bus;
   connecting a battery configured to receive excess current from said DC bus system when said photo-voltaic power source provides energy input into said DC bus in excess of energy used by said first direct current load and/or said second direct current load;
   wherein electrical current from said battery powers, at least in part, said first direct current load and said second direct current load only when said AC power source fails to provide electric current, and said photo-voltaic power source falls below a current required by said first direct current load and said direct current load.

2. The method of claim 1, wherein carrying out steps steps of claim 1 cause, over a subsequent 24-hour period, a majority of power to said first direct current load and said second direct load, to be provided by way of output from said photo-voltaic power source without conversion to AC.

3. A method of powering a DC bus system and DC load using a photo-voltaic power source, comprising the steps, in any order, of:
   connecting a first direct current load to a DC bus;

connecting a photo-voltaic power source to said DC bus such that said photo-voltaic power source has a maximum output into said DC bus greater than that of said first direct current load;

connecting an AC power source to an AC/DC converter which is connected to said DC bus, wherein said AC power source provides power to said DC bus only when said photo-voltaic power source provides output below said first direct current load;

wherein electrical current from said AC power source powers, at least in part, said first direct current load and said second direct load only when output from said photo-voltaic power source falls below a current required by said first direct current load or a second direct load.

4. A method of directly powering a DC bus system and DC load using a photo-voltaic power source, comprising the steps, in any order, of:

connecting a first direct current load to a DC bus;

connecting a photo-voltaic power source to said DC bus such that said photo-voltaic power source has a maximum output into said DC bus greater than that of said first direct current load;

connecting an AC power source to an AC/DC converter which is connected to said DC bus, wherein said AC power source provides power to said DC bus only when said photo-voltaic power source provides output below said first direct current load;

wherein electrical current from said AC power source powers, at least in part, said first direct current load and said second direct load only when output from said photo-voltaic power source falls below a current required by a combination of said first direct current load and said second direct load.

* * * * *